(12) United States Patent
Wu et al.

(10) Patent No.: US 9,094,431 B2
(45) Date of Patent: Jul. 28, 2015

(54) VERIFICATION OF NETWORK DEVICE POSITION

(71) Applicant: miiiCasa Taiwan Inc., Taipei (TW)

(72) Inventors: Min-Hui Wu, Taipei (TW); Yi-Hua Liang, Taipei (TW); Yu-Sheng Lin, Taipei (TW)

(73) Assignee: miiiCasa Taiwan Inc., Taipei (TW)

( * ) Notice: Subject to any disclaimer, the term of this patent is extended or adjusted under 35 U.S.C. 154(b) by 67 days.

(21) Appl. No.: 13/666,838

(22) Filed: Nov. 1, 2012

(65) Prior Publication Data

US 2014/0123233 A1    May 1, 2014

(51) Int. Cl.
*H04L 29/06* (2006.01)
*H04L 29/08* (2006.01)
*H04L 12/58* (2006.01)

(52) U.S. Cl.
CPC .............. *H04L 63/123* (2013.01); *H04L 51/20* (2013.01); *H04L 63/107* (2013.01); *H04L 67/24* (2013.01); *H04L 63/162* (2013.01)

(58) Field of Classification Search
None
See application file for complete search history.

(56) References Cited

U.S. PATENT DOCUMENTS

| | | | | |
|---|---|---|---|---|
| 6,470,453 B1* | 10/2002 | Vilhuber | ........................... | 726/4 |
| 7,539,862 B2* | 5/2009 | Edgett et al. | ................... | 713/168 |
| 7,697,942 B2* | 4/2010 | Stevens | ....................... | 455/456.1 |
| 7,925,697 B2* | 4/2011 | Futa et al. | ...................... | 709/204 |
| 7,937,092 B2* | 5/2011 | Shim | ......................... | 455/456.1 |
| 8,087,068 B1* | 12/2011 | Downey et al. | .................... | 726/4 |
| 8,112,066 B2* | 2/2012 | Ben Ayed | ...................... | 455/411 |
| 8,224,354 B2* | 7/2012 | De Vries et al. | ............ | 455/456.3 |
| 8,276,209 B2* | 9/2012 | Knibbeler et al. | ............... | 726/30 |
| 8,639,922 B2* | 1/2014 | Phatak | ........................... | 713/156 |
| 2002/0194501 A1* | 12/2002 | Wenocur et al. | ............... | 713/201 |
| 2005/0091338 A1* | 4/2005 | de la Huerga | ................. | 709/217 |
| 2006/0212928 A1* | 9/2006 | Maino et al. | ....................... | 726/4 |
| 2010/0122305 A1* | 5/2010 | Moloney | ......................... | 725/93 |
| 2012/0150748 A1* | 6/2012 | Law et al. | ....................... | 705/71 |

(Continued)

FOREIGN PATENT DOCUMENTS

TW    200931889         7/2009
TW    201141190 A1    11/2011

OTHER PUBLICATIONS

Aura, Tuomas; Roe, Michael; Murdoch, Steven J. Securing Network Location Awareness with Authenticated DHCP. SecureComm 2007. Pub. Date: 2007. Relevant pp. 391-402. http://ieeexplore.ieee.org/stamp/stamp.jsp?tp=&arnumber=4550359.*

(Continued)

*Primary Examiner* — Dede Zecher
*Assistant Examiner* — Jeremiah Avery
(74) *Attorney, Agent, or Firm* — Novak Druce Connolly Bove + Quigg LLP

(57) ABSTRACT

In one aspect of the invention, a method for verifying locations of devices is provided. The method is implemented in a system having at least a client device, a network device and a server (collectively the "endpoints".) At least a first token, a device listing information and an authorization parameter are transmitted in the system via a browser or any web application, to enable endpoints to verify that the client device has logged in to the server and the client device and the network device are in a same network. In another embodiment, a method for verifying locations of devices implemented on a server is provided. In yet another embodiment, a method for verifying locations of devices implemented on a network device is provided.

14 Claims, 16 Drawing Sheets

(56) References Cited

U.S. PATENT DOCUMENTS

2012/0151210 A1* 6/2012 Perez ............................ 713/168
2012/0254428 A1* 10/2012 Isozaki et al. ................. 709/225

OTHER PUBLICATIONS

Zhang, Feng; Kondoro, Aron; Muftic, Sead. Location-based Authentication and Authorization Using Smart Phones. 2012 IEEE 11th International Conference on Trust, Security and Privacy in Computing and Communications (TrustCom). Pub. Date: 2012. Relevant pp. 1285-1292. http://ieeexplore.ieee.org/stamp/stamp.jsp?tp=&arnumber=6296127.*

Chen, Yen-Cheng; Chan, Yao-Jung; She, Cheung-Wo. Enabling Location-Based Services on Wireless LANs. The 11th IEEE International Conference on Networks, 2003. ICON2003. Pub. Date: 2003. Relevant pp. 567-572. http://ieeexplore.ieee.org/stamp/stamp.jsp?tp=&arnumber=1266251.*

* cited by examiner

VERIFICATION OF NETWORK DEVICE POSITION

FIELD OF THE INVENTION

The present invention relates generally to a device location verification method, and more specifically to a device location verification method implemented in a system having at least a client device, a network device and a server.

BACKGROUND OF THE INVENTION

Ordinary instant messaging software applications, such as Windows MSN or skype, or peer-to-peer software applications, verify whether two network devices are in a same network before performing a file transmission. If the two network devices are not in a same network, a server will establish a connection between each network device respectively and the file is transferred from one network device to another via the server. On the other hand, if the two network devices are in a same network, a direct connection between the two devices is established. In this way, the total travelling distance of the data is shortened, the data transmission delay is reduced, the resource of the network device is preserved, and the loading of the server is relieved.

Conventional measure for an application to locate other network devices is through asking the operating system to broadcast on the data link layer of the open systems communication (OSI) model in a local area network. The result of the broadcast can then be used to verify that the two network devices are in a same local area network. Specifically, identification codes of the network devices are retrieved corresponding to the broadcast. Then, information is retrieved from the server to verify that such identification codes do represent the network devices that direct data transmission, i.e., peer-to-peer data transmission, is to be established later.

However, the broadcasting mechanism cannot be implemented in some applications, such as the browser. One reason is that browsers only support the Hypertext Transfer Protocol ("HTTP") and cannot use other communication protocols to ask the operating system to broadcast and capture responses on the data link layer of the OSI model so as to explore other network devices in a same local area network. In addition, application developers need to customize their applications according to the protocol that the operating system of the network device uses, instead of using the common HTTP. Complexity of application development is accordingly increased. Therefore, there is a need in the art for a browser or other applications not capable of requesting an operating system to broadcast and capture response on the data link layer of the OSI model to verify whether it is in a same local area network with other network devices.

BRIEF SUMMARY OF THE INVENTION

In one embodiment, a method for verifying locations of devices implemented in a system having at least a server, a client device and a network device is provided. The verification method includes receiving in the server a first request to login from a client device. If the login succeeds, the server transmits a first response to the client device. The first response includes at least a first token and a network device listing information, and the first token enables the client device to control the network device. In addition, the verification method includes receiving in the server a second request asking at least an authorization parameter from the client device, and the server correspondingly transmitting a second response to the client device. The second response includes at least the authorization parameter. Moreover, the verification method includes receiving in the network device a first authorization request from the client device. If the first authorization request includes at least the first token and the authorization parameter, the network device transmits a second authorization request having at least the authorization parameter to the server. The verification method further includes receiving in the server the second authorization request from the network device, and verifying in the server the second authorization request includes the authorization parameter.

Furthermore, the verification method may include receiving in the network device a third request from the client device. The client device correspondingly transmits a third response to the client device. The third response includes at least a device information. The verification method may further include transmitting from the server a second token to the client device, and later the client device transmits the second token to the network device. The second token may enable the client device to access the network device. The verification method may also include generating in the server a verified result if the server verifies that the second authorization request includes at least the authorization parameter. The server may transmit the verified result to the client device directly. Alternatively, the server may transmit the verified result to the network device, so the network device may transmit the verified result to the client device.

Accordingly, the verification method of the present invention enables the client device, the sever and the network device to verify that the client device and the network device are in a same network, and that the client device has logged in to the server, via a browser or an application utilizing HTTP or any protocol not capable of requesting an operating system to broadcast and capture response on the data link layer of the OSI model. As a result, communication within a same local area network between the client device and the network device may be established, and data may be transmitted between the client device and the network device without going through the server outside such local area network.

It should be understood, however, that this Summary may not contain all aspects and embodiments of the present invention, that this Summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1A:
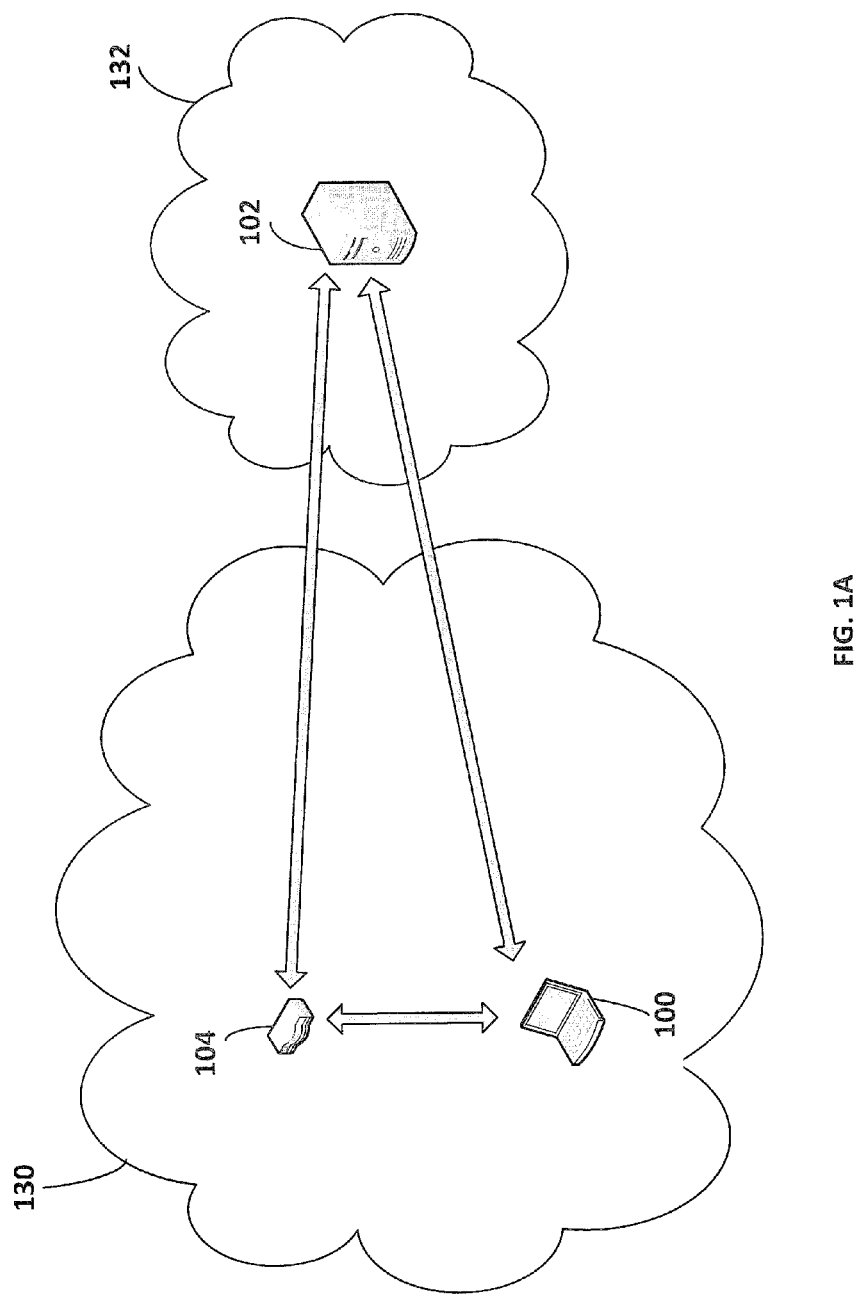
FIGS. 1A-1E are a schematic illustrations of the system implementing the device location verification method according to some embodiments of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 110 percent, preferably within 100 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1A-4. Reference will be made to the drawing figures to describe the present invention in detail, wherein depicted elements are not necessarily shown to scale and wherein like or similar elements are designated by same or similar reference numeral through the several views and same or similar terminology. In accordance with the purposes of this invention, as embodied and broadly described herein, this invention, FIGS. 1A-1E are a schematic illustrations of the system implementing the device location verification method according to some embodiments of the present invention. The location of devices may be physical addresses of the devices or virtual addresses of the devices in a network.

FIG. 1A is an illustration of the system implementing the device location verification method having a first client device 100, a server 102 and a first network device 104 according to one embodiment of the present invention. The first client device 100 and the first network device 104 are in a first network 130, and the server 102 is in a second network 132. The first client device 100, the server 102 and the first network device 104 are electronically communicative with one another. In this embodiment, a user at the first client device 100 uses a browser, which mainly utilizes the Hypertext Transfer Protocol ("HTTP"), to communicate between the server 102 and the first network device 104 to implement the verification method in the present invention to verify that the first client device 100 and the first network device 104 are in a same network, i.e., the first network 130. Specifically, the communications between the first client device 100, the server 102 and the first network device 104 enable each of them to verify that the first client device 100 and the first network device 104 are in a same network, and that the user at the first client device 100 has logged in to the server 102. Thereafter, the first client device 100 and the first network device 104 may establish a connection within a same local area network for data transmission. It is to be noted that the first client device 100 may use applications other than a browser to implement the verification method of the present invention. Further, such application on the first client device 100 may utilize protocols other than HTTP. That is, the first client device 100 may use any application utilizing any protocol to implement the verification method of the present invention. Specifically, any application utilizing a protocol that cannot request an operating system to broadcast and capture response on the data link layer in the Open Systems Interconnection (OSI) model may be used by the first client device 100 to implement the verification method of the present invention. Such protocols do not include CIFS, UPnP, DLNA, Apple Talk, Bonjour, or the like, as they may request an operating system to broadcast and capture response on the data link layer in the OSI model.

The first network 130 in the present invention may be a local area network, which may be a wired or wireless setting. The second network 132 may be a local area network, a wide area network, a mobile communication network or the Internet. The first client device 100 in the present invention may be any computing device with Internet connectivity, such as a desktop computer, a laptop computer, a tablet computer, or a handheld device such as a personal digital assistant or a smart phone. The server 102 of the present invention may be a single server, a server group constituted of several servers or a data center. The first network device 104 in the present invention may be any device with Internet access and storage, including but not limited to network-attached storage (NAS), a storage area network (SAN), a work station, a modem, a gateway, a proxy server, a wireless access point, a wireless hot spot, a femtocell, an Internet TV, and a set-up box. Alternatively, the first network device 104 may be any device with Internet access and that can generate content, including but not limited to an IP camera, a sensor, a surveillance camera, a video recorder, a digital camera, and a scanner. It is to be noted that the aforementioned devices are merely exemplary and the present invention is not so limited.

The verification method of the present invention includes: a user at the first client device 100 logs-in to the server 102, and the sever 102 correspondingly transmits a first token and a network device listing information. The first token enables the first client device 100 to control the first network device 104 to transmit an authorization request to the server 102 when the first client device 100 and the first network device 104 are in a same network. That is, the first token enables the first network device 104 to verify that it is in a same network as the first client device 100 when the first network device 104 receives the first token from the first client device 100. Moreover, the network device listing information may include a listing of all the network devices potentially in the same network as the first client device 100, the uniform resource locator (URL) of the application programming interface (API) of the network devices, or the names of the network devices, but the present invention is not so limited. By performing the aforementioned steps, the first client device 100 and the server 102 both verify that a user at the first client device 100 has logged in to the server 102. In one embodiment, the server 102 may determine the location of the first client device 100 in the first network 130 according to the source IP address of the login request from the first client device 100. According to the source IP address, the server 102 may collect relevant information of the network devices potentially in the first network 130, combine the information into device listing information, and transmit the device listing information to the first client device 100. Specifically, the device listing information may include IP address, URL, name of device, API version, or web service port number of the network devices potentially in the first network 130. Accordingly, the first client device 100 may communicate with all the network devices potentially in the first network 130, and utilizes the verification method of the present invention.

The verification method of the present invention further includes the first client device 100 transmitting a first request to the server 102. Correspondingly, the server 102 transmits an authorization parameter to the first client device 100. The authorization parameter is later used by the first client device 100 to prove to the server 102 that it has logged in to the server 102, and that the first client device 100 and the first network device 104 are in a same network. Furthermore, a second token may be transmitted along with the authorization parameter to the first client device 100. The second token include information enabling the first client device 100 to access the first network device 104. In further detail, the first client device 100 may access specific data, file, folder, directory or document in the first network device 104. The second token may be later transmitted to the first network device 104 so the first network device 104 may verify that the first client device 100 has logged in to the server 102.

The verification method of the present invention further includes the first client device 100 transmitting a first authorization request to the first network device 104 according to the device listing information. The first authorization request comprises the first token and the authorization parameter. The first token enables the first network device 104 to know that the first client device 100 and the first network device 104 are in a same network. In detail, the first token may trigger the first network device 104 to broadcast in the local area network and determine whether the source of the response is within a same local area network. If yes, specific performance at the first network device 104 may be executed. In other words, the first token enables the first network device 104 to verify that the first client device 100 and the first network device 104 are in a same network. If yes, the first client device 100 may be authorized to control the first network device 104 to perform specific operations, such as responding specific information. In addition, the first client device 100 may control the first network device 104 to transmit a second authorization request to the server 102 corresponding to the first client device 100. Thereafter, the first network device 104 verifies that the first authorization request does comprise the authorization parameter and the first token. If no, the first network device transmits an error message to the first client device 100. If yes, the first network device 104 is triggered by the first token and transmits a second authorization request having the authorization parameter to the server 102. Moreover, the first authorization request may comprise the second token. When the first network device 104 verifies that the first authorization request comprises the second token, the first network device 104 may verify that the first client device 100 has logged in to the server 102.

The verification method of the present invention further includes the server 102 verifying whether the second authorization request comprises the authorization parameter. If no, the server 102 transmits an error message to the first network device 104. If yes, the server 102 generates a verified result. The aforementioned steps enable the server 102 to verify that the first client device 100 and the first network device 104 are in the same network, and that the user at the first client device 100 has logged in to the server 102. Furthermore, the verified result is transmitted to the first network device 104. By receiving the verified result, the first network device 104 verifies that the user at the first client device 100 has logged in to the server 102. Thereafter, the verified result is transmitted by the first network device 104 to the first client device 100. By receiving the verified result, the first client device 100 verifies that it is in the same network as the first network device 104. Alternatively, the verified result may be first transmitted to the first client device 100, and then to the first network device 104. It is to be noted that the second token may be transmitted to the first network device 104 by the first client device 100 along with the verified result so the first network device 104 may verify that the first client device 100 has logged in to the server 102.

Accordingly, the verification method of the present invention enables the first client device 100, the sever 102 and the first network device 104 to verify that the first client device 100 and the first network device 104 are in a same network, and that the first client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 1B:
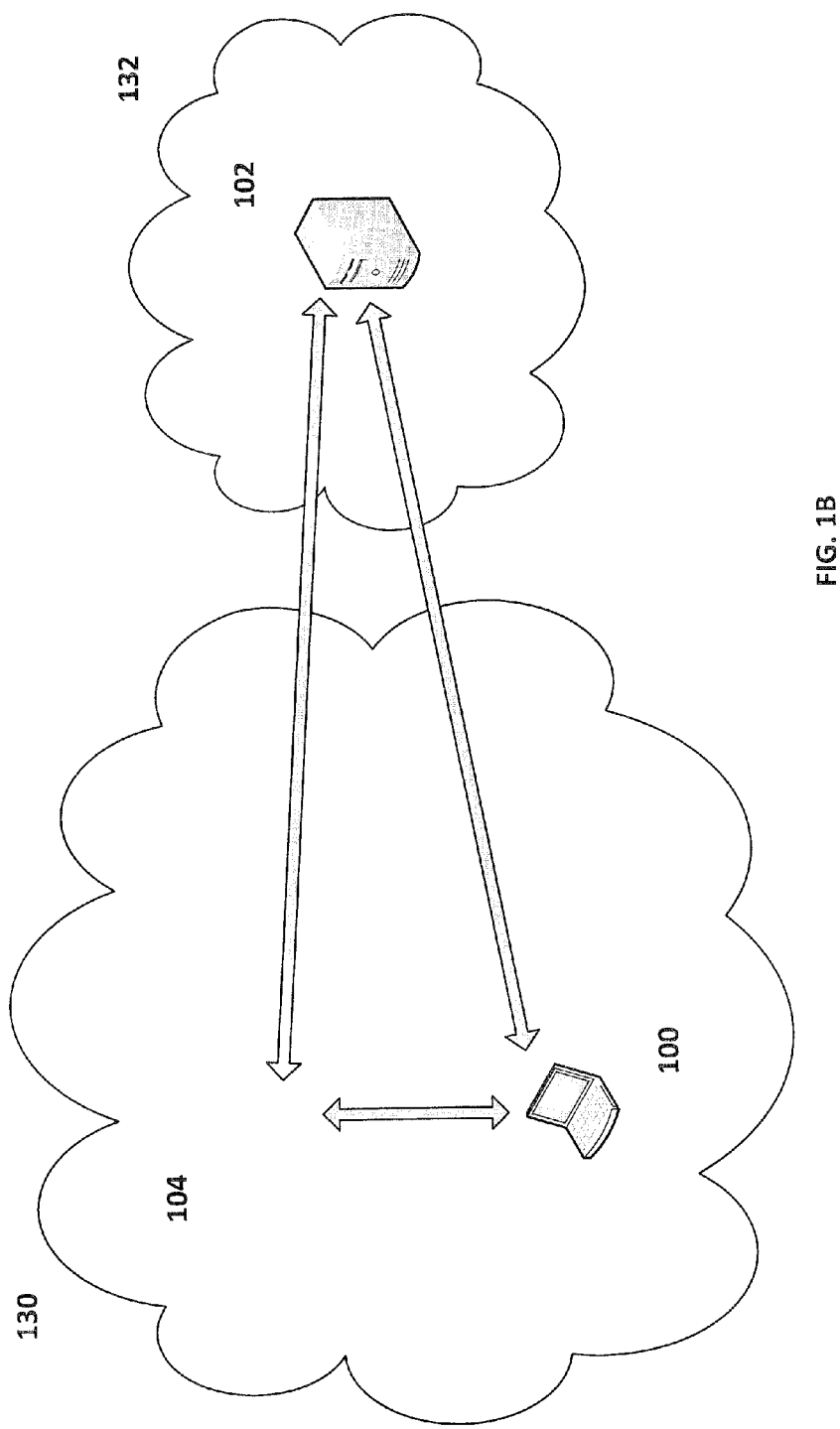

FIG. 1B is an illustration of the exemplary system implementing the device location verification method according to one embodiment of the present invention. The first client device 100 and the first network device 104 are in a first network 130, and the server 102 is in a second network 132. The first client device 100, the server 102 and the first network device 104 are electronically communicative with one another. The first client device 100 uses a browser or an application utilizing HTTP or any protocol not capable of requesting an operating system to broadcast and capture response on the data link layer of the OSI model to implement the verification method of the present invention.

Here, the first network device 104 is capable of generating content. For example, the first network device 104 may be a video recorder (as illustrated), a digital camera, a surveillance camera, . . . etc. Specifically, the first network device 104 may possess zero or limited storage capacity. Therefore, peripheral storage apparatus 106 may be linked, through wire or wirelessly, to the first network device 104 to expand the storage capacity of the first network device 104. In this embodiment, after each of the first client device 100, the server 102 and the first network device 104 verifies that the first client device 100 and the first network device 104 are in a same network, and that the user at the first client device 100 has logged in to the server 102, a connection within a same local area network may be established between the first client device 100 and the first network device 104. As a result, the first client device 100 may access the peripheral storage apparatus 106, which is linked to the first network device 104. It is to be noted that the peripheral storage apparatus 106 may be a thumb drive, an external hard drive, a magnetic hard discs, optical discs, floppy discs, flash memories, or forms of electrically programmable memories (EPROM) or electrically erasable and programmable (EEPROM) memories, but the present invention is not so limited.

Figure 1C:
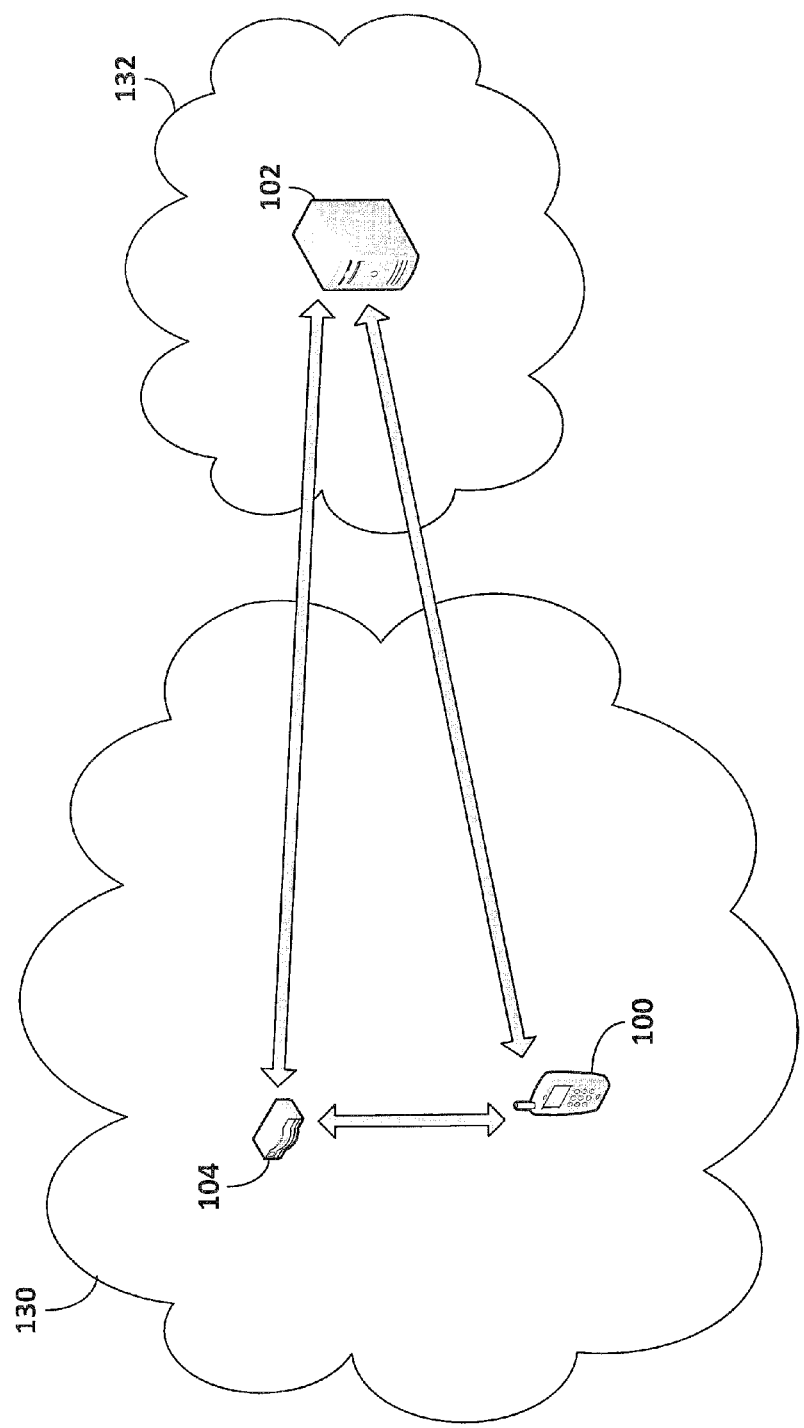

FIG. 1C is an illustration of the exemplary system implementing the device location verification method according to one embodiment of the present invention. The first client device 100 and the first network device 104 are in a first network 130, and the server 102 is in a second network 132. The first client device 100, the server 102 and the first network device 104 are electronically communicative with one another. In this embodiment, the first client device 100 may be a portable electronic device. Example of portable electronic devices includes, but is not limited to, a smart phone, a personal digital assistant and a tablet computer. In some embodiments, the first client device 100 may be operating on different operating systems, such as Windows, Android, iOS or the like, and may utilize only one communication protocol (such as HTTP) to verify whether the first client device 100 and the first network device 104 are in a same network. That is, the verification method of the present invention does not need to use operating-system-specific communication protocols for each aforementioned operating system to broadcast and capture response on the data link layer in the OSI model. Therefore, the verification method of the present invention may be applicable in diverse-operating-system settings. Accordingly, the user of the first client device 100 may use a browser on the portable electronic device, or use applications other than a browser to implement the present invention. Particularly, any application that utilizes a protocol that cannot request an operating system to broadcast and capture response on the data link layer in the OSI model may be used by the user at the first client device 100 to implement the present invention. Such protocols do not include CIFS, UPnP, DLNA, Apple Talk, Bonjour, or the like, as they may request an operating system to broadcast and capture response on the data link layer in the OSI model.

Figure 1D:
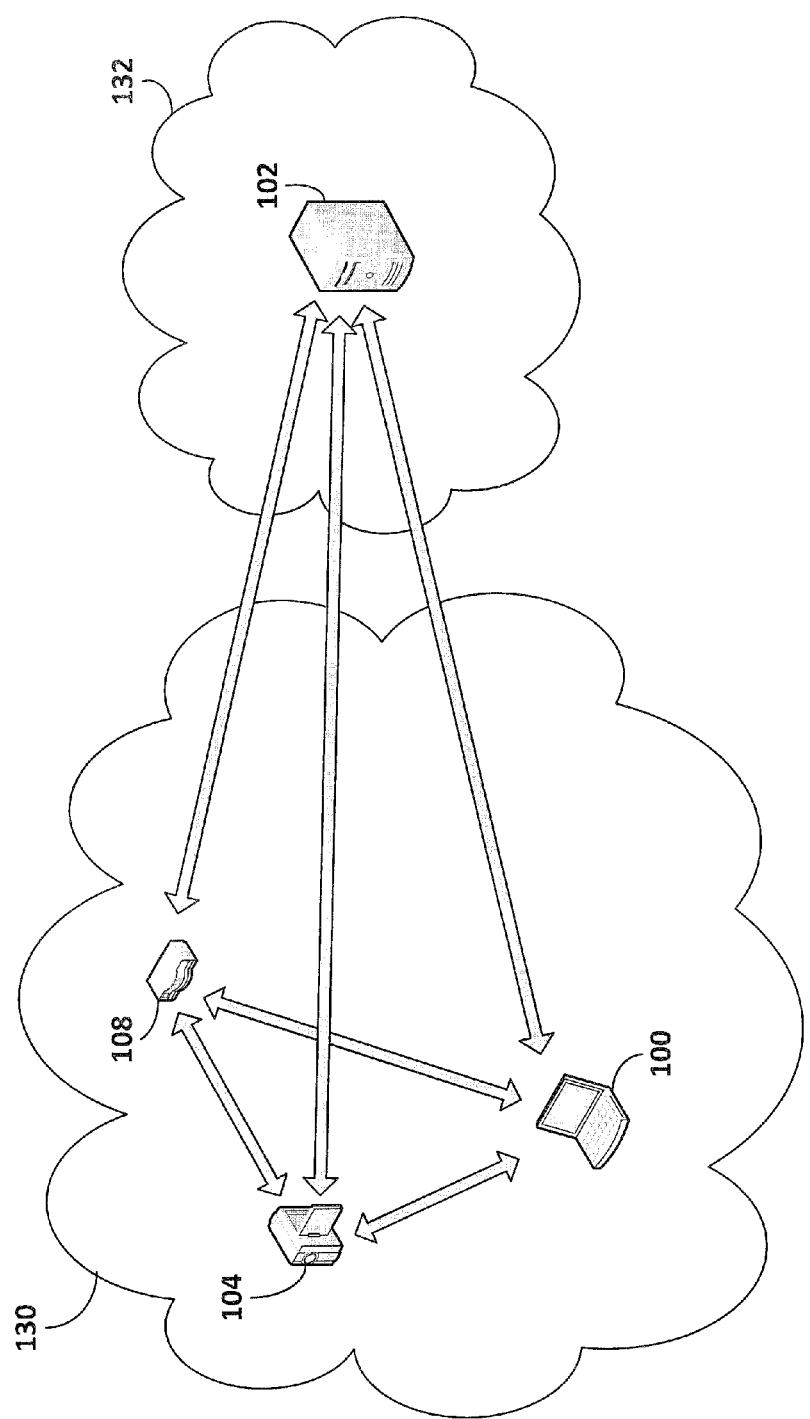

FIG. 1D is an illustration of the exemplary system implementing the device location verification method having a first client device 100, a server 102, a first network device 104 and a second network device 108 according to one embodiment of the present invention. The first client device 100, the first network device 104 and the second network device 108 are in a first network 130, and the server 102 is in a second network 132. The first client device 100, the server 102, the first network device 104 and the second network device 108 are electronically communicative with one another. The first client device 100 uses a browser or an application utilizing HTTP or any protocol not capable of requesting an operating system to broadcast and capture response on the data link layer of the OSI model to implement the verification method of the present invention. Here, after the verification method of is implemented, the first client device 100 verifies that it is in a same network with the first network device 104 and the second network device 108. Specifically, each of the first client device 100, the server 102, the first network device 104 and the second network device 108 verifies that the first client device 100, the first network device 104 and the second network device 108 are in a same network, and that the user at the first client device 100 has logged in to the server 102. Thereafter, the first client device 100 may establish a connection between the first network device 104 and/or the second network device 108. Moreover, the first client device 100 may enable the first network device 104 and the second network device 108 to communicate with each other. It is to be noted that the number of network devices may be increased, so a user may establish connection between each network device to access or transmit files between such network devices, or enable the network devices to access one another.

In one embodiment, after first client device 100, the sever 102, the first network device 104 and the second network device 108 verify that the first client device 100, the first network device 104 and the second network device 108 are in a same network, and that the first client device 100 has logged in to the server 102, the first client device 100 may generate an output display showing the first network device 104 and the second network device 108. The output display enables a user at the first client device 100 to choose to transmit data between the first network device 104 or the second network device 108. The output display further enables such user at the first client device 100 to control the first network device 104 and the second network device 108 to transmit data via the first client device 100.

Figure 1E:
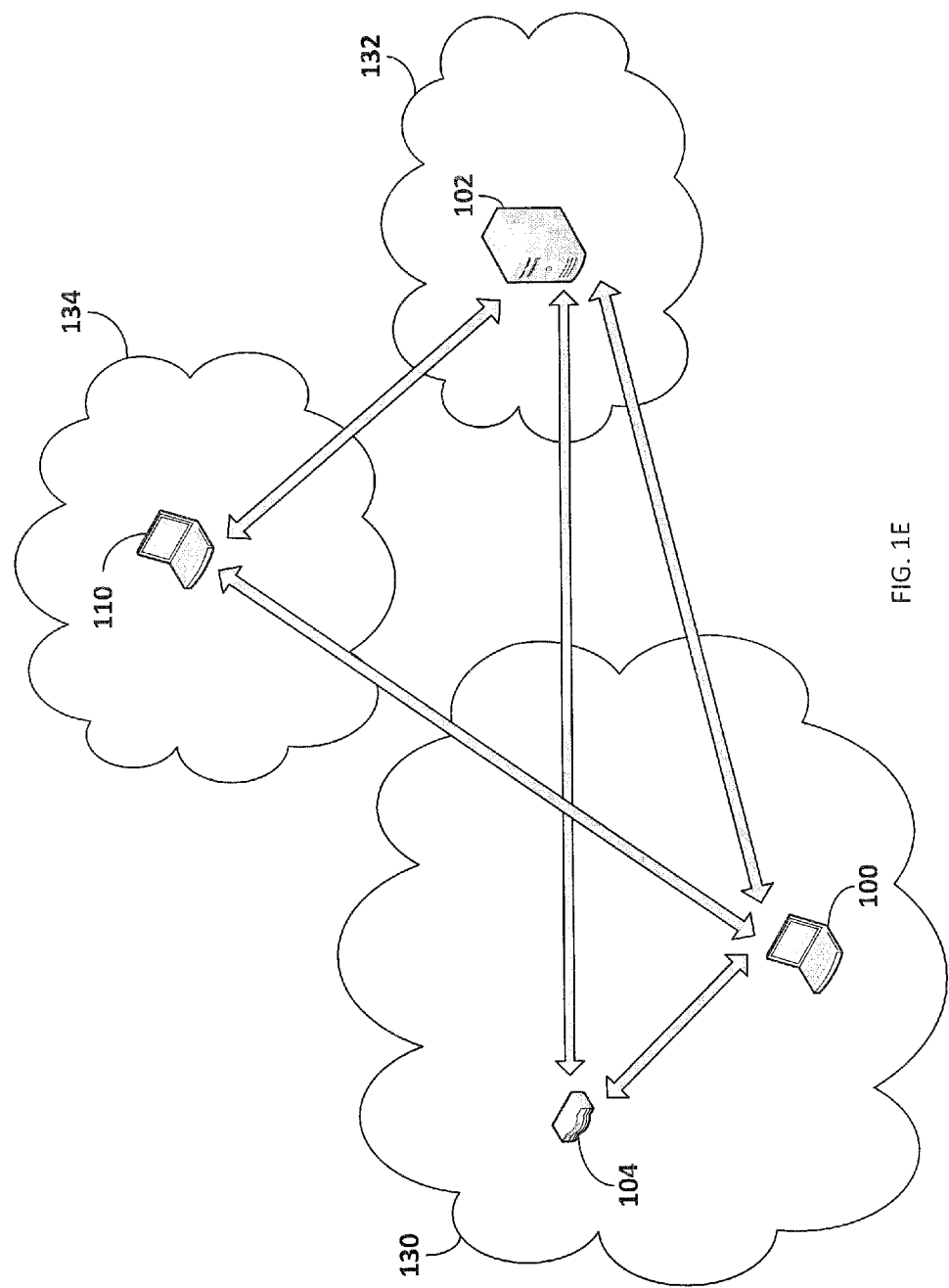

FIG. 1E is an illustration of the exemplary system implementing the device location verification method having a first client device 100, a server 102, a first network device 104 and a second client device 110 according to one embodiment of the present invention. The first client device 100 and the first network device 104 are in a first network 130, the server 102 is in a second network 132, and the second client device 110 is in a third network 134. The first client device 100, the server 102, the first network device 104 and the second client device 110 are electronically communicative with one another. The first client device 100 uses a browser or an application utilizing HTTP or any protocol not capable of requesting an operating system to broadcast and capture response on the data link layer of the OSI model to implement the verification method of the present invention. Here, after the verification method is implemented, the first client device 100 verifies that it is in a same network with the first network device 104. Thereafter, the user at the first client device 100 may invite the second client device 110 to access the first network device 104, as if the second client device 110 is also in the same network, i.e., the first network 130, with the first network device 104 and the first client device 100.

FIGS. 2A-2F are flow diagrams of the device location verification method according to some embodiments of the present invention. The location of devices may be physical addresses of the devices or virtual addresses of the devices in a network.

Figure 2A:
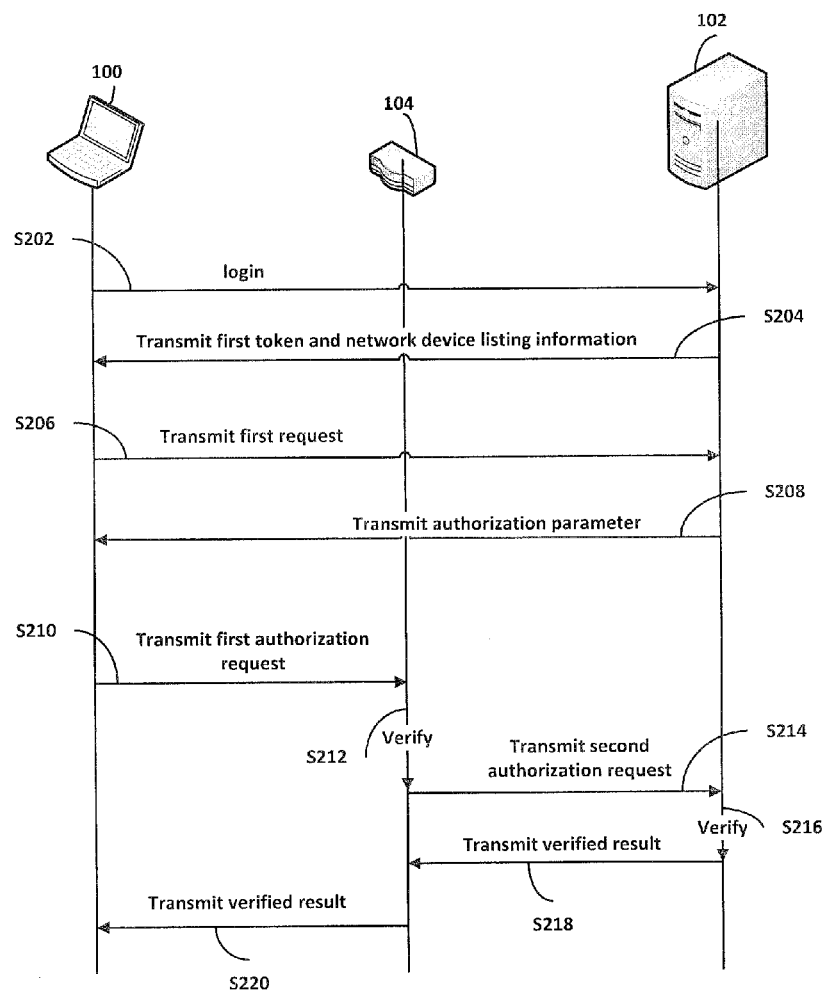
FIGS. 2A-2F are flow diagrams of the device location verification method according to some embodiments of the present invention.

FIG. 2A is a flow diagram of the exemplary device location verification method according to some embodiments of the present invention. The verification method is implemented in a system having a first client device 100, a sever 102 and a first network device 104, being electronically communicative to one another. The first client device 100 implements the verification method of the present invention via a browser or application utilizing HTTP or any protocol. Specifically, protocols not capable of requesting an operating system to broadcast and capture response on the data link layer of the OSI model can also be used to implement the verification method of the present invention. After the verification is implemented, the first client device 100, the sever 102 and the first network device 104 will verify that the first client device 100 and the first network device 104 are in a same network, and that the client device 100 has logged in to the server 102.

In step S202, a user at the first client device 100 logs-in to the server 102, and in step S204, the sever 102 correspondingly transmits a first token and a network device listing information. The first token enables the first client device 100 to control the first network device 104 to transmit an authorization request to the server 102 when the first client device 100 and the first network device 104 are in a same network. That is, the first token enables the first network device 104 to verify that it is in a same network as the first client device 100 when the first network device 104 receives the first token from the first client device 100. Moreover, the network device listing information may include a listing of all the network devices potentially in the same network as the first client device 100, the uniform resource locator (URL) of the application programming interface (API) of the network devices, or the names of the network devices, but the present invention is not so limited. In one embodiment, the server 102 may determine the location of the first client device 100 in the first network 130 according to the source IP address of the login request from the first client device 100. According to the source IP address, the server 102 may collect relevant information of the network devices potentially in the first network 130, combine the information into device listing information, and transmit the device listing information to the first client device 100. Specifically, the device listing information may include IP address, URL, name of device, API version, or web service port number of the network devices potentially in the first network 130. Accordingly, the first client device 100 may communicate with all the network devices potentially in the first network 130, and utilizes the verification method of the present invention. In steps S202 and S204, the first client device 100 and the server 102 both verify that a user at the first client device 100 has logged in to the server 102.

In step S206, the first client device 100 transmits a first request to the server 102. In step S208, the server 102 correspondingly transmits an authorization parameter to the first client device 100. The authorization parameter is later used by the first client device 100 to prove to the server 102 that it has logged in to the server 102, and that the first client device 100 and the first network device 104 are in a same network. Furthermore, a second token may be transmitted along with the authorization parameter to the first client device 100 in step S208. (Not illustrated.) The second token include information enabling the first client device 100 to access the first network device 104. In further detail, the first client device 100 may access specific data, file, folder, directory or document in the first network device 104. The second token may be later transmitted to the first network device 104 so the first network device 104 may verify that the first client device 100 has logged in to the server 102.

In step S210, the first client device 100 transmits a first authorization request to the first network device 104 according to the device listing information. The first authorization request comprises the first token and the authorization parameter. The first token enables the first network device 104 to know that the first client device 100 and the first network device 104 are in a same network. In detail, the first token may trigger the first network device 104 to broadcast in the local area network and determine whether the source of the response is within a same local area network. If yes, specific performance at the first network device 104 may be executed. In other words, the first token enables the first network device 104 to verify that the first client device 100 and the first network device 104 are in a same network. If yes, the first client device 100 may be authorized to control the first network device 104 to perform specific operations, such as responding specific information. In addition, the first client device 100 may control the first network device 104 to transmit a second authorization request to the server 102 corresponding to the first client device 100. In step S212, the first network device 104 verifies that the first authorization request does comprise the authorization parameter and the first token. If no, the first network device transmits an error message to the first client device 100. If yes, the first network device 104 is triggered by the first token and transmits a second authorization request having the authorization parameter to the server 102 in step S214. Moreover, the first authorization request may comprise the second token. In step S212, when the first network device 104 verifies that the first authorization request comprises the second token, the first network device 104 may verify that the first client device 100 has logged in to the server 102.

In step 216, the server 102 verifies whether the second authorization request comprises the authorization parameter. If no, the server 102 transmits an error message to the first network device 104. If yes, the server 102 generates a verified result. Through steps S206-S216, the server 102 verifies that the first client device 100 and the first network device 104 are in the same network, and that the user at the first client device 100 has logged in to the server 102. In step S218, the verified result is transmitted to the first network device 104. By receiving the verified result, the first network device 104 verifies that the user at the first client device 100 has logged in to the server 102. In step S220, the verified result is transmitted by the first network device 104 to the first client device 100. By receiving the verified result, the first client device 100 verifies that it is in the same network as the first network device 104. Alternatively, the verified result may be first transmitted to the first client device 100, and then to the first network device 104. It is to be noted that the second token may be transmitted to the first network device 104 by the first client device 100 along with the verified result so the first network device 104 may verify that the first client device 100 has logged in to the server 102.

In one embodiment, the first client device 100 may generate an output display. The output display allows the user to control the data transmission between the first client device 100 and the first network device 104. In another embodiment, the first client device may generate an output display having the network device listing information transmitted by the server 102 in step S204. The user may select a specific network device from the displayed network device listing information. Thereafter, steps S206-S220 of the verification method of the present invention may be implemented on the network device selected by the user. In another embodiment, the first client device may generate a user interface, and the user may select relevant data access instructions for the first network device 104 from the user interface. In addition, such data access instructions may be transmitted along with the second token to the first network device 104 to have the first network device 104 execute such data access instructions.

Accordingly, the verification method of the present invention enables the first client device 100, the sever 102 and the first network device 104 to verify that the first client device 100 and the first network device 104 are in a same network, and that the first client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 2B:
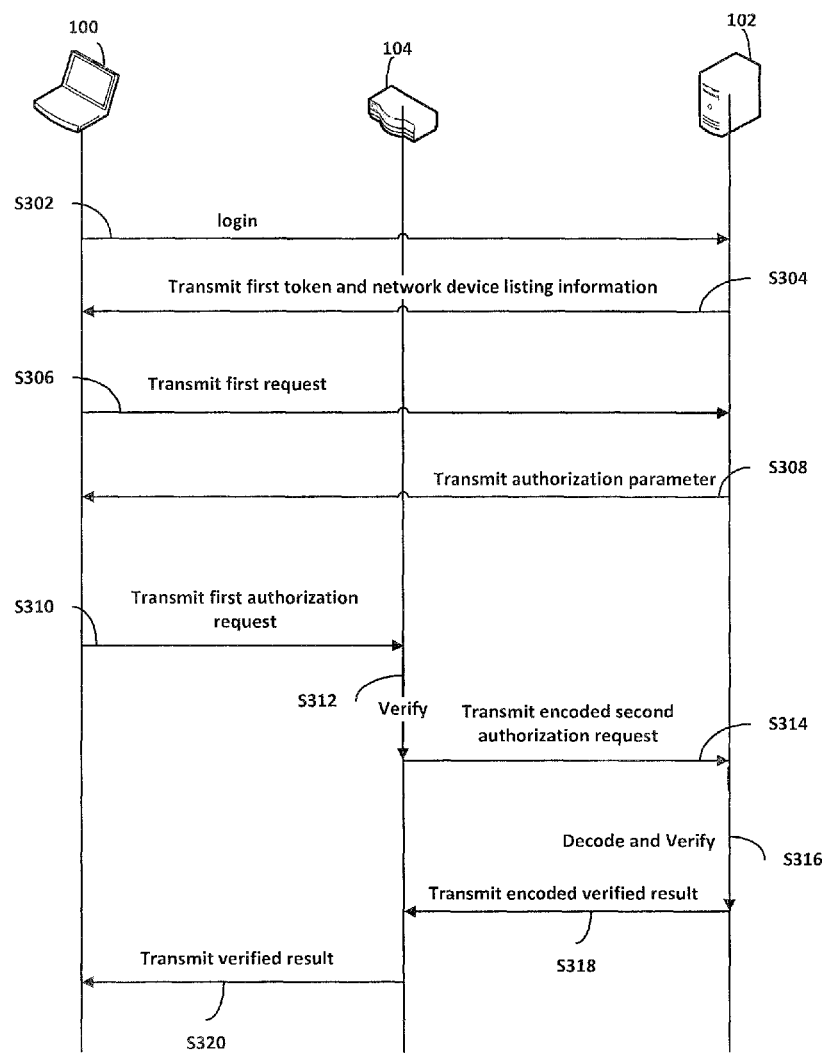

FIG. 2B is a flow diagram of the exemplary device location verification method according to some embodiments of the present invention. Features in steps S302-S310 in this embodiment are identical to the steps S202-S210 in the embodiment disclosed in FIG. 2A. In step S312, the first network device 104 generates the second authorization request after verifying that the first authorization request comprises the first token and the authorization parameter. The second authorization request comprises the authorization parameter. Specifically, the second authorization request is encoded. In step S314, the first network device 104 transmits the encoded second authorization request to the server 102. In step S316, the server 102 decodes the second authorization request and if the second authorization request comprises the authorization parameter, the server 102 generates and encodes a verified result. In step S318, the server 102 transmits the encoded verified result to the first network device 104, which is capable of decoding the verified result. In step S320, the first network device 104 then transmits the verified result, encoded or decoded, to the first client device 100, which is capable of decoding the verified result. Such encoding mechanism provides extra safety for the verification method of the present invention. By receiving the verified result, the first network device 104 verifies that the user at the first client device 100 has logged in to the server 102. By receiving the verified result, the first client device 100 verifies that it is in the same network as the first network device 104. Accordingly, the verification method of the present invention enables the first client device 100, the sever 102 and the first network device 104 to verify that the first client device 100 and the first network device 104 are in a same network, and that the first client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 2C:
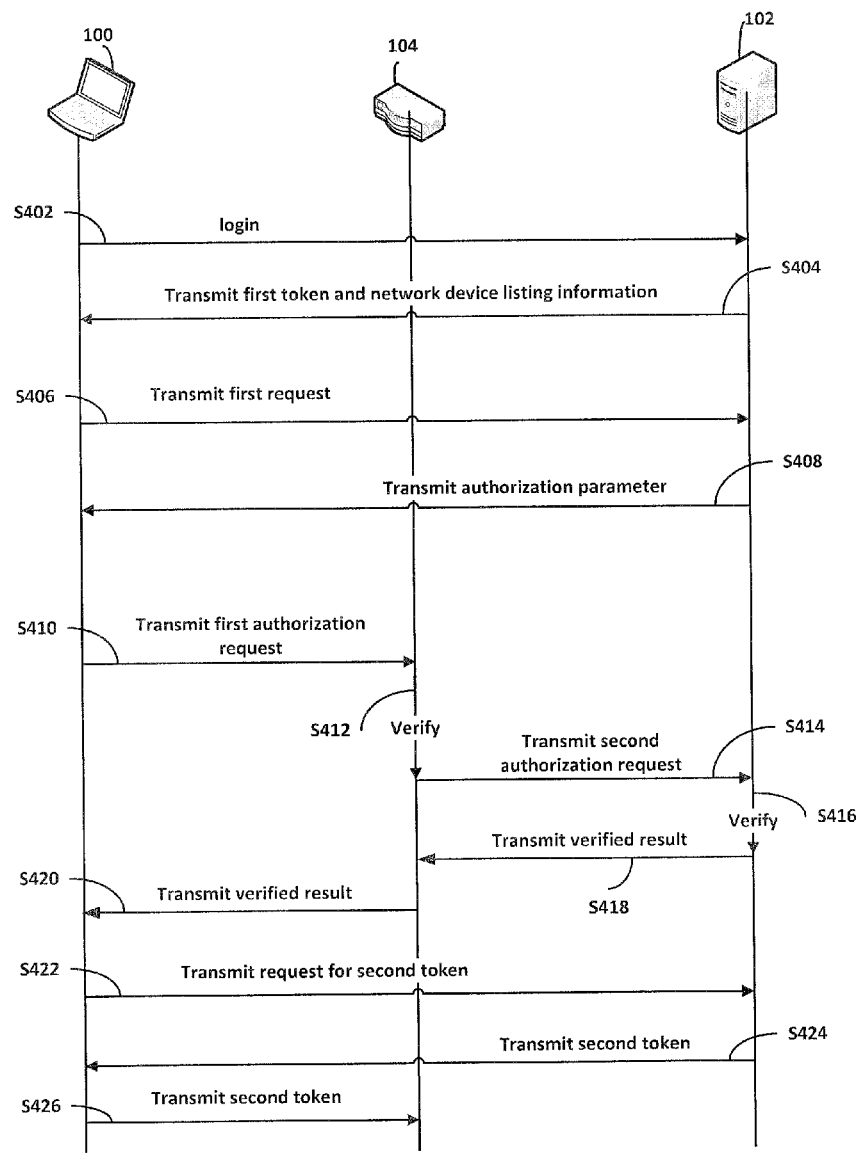

FIG. 2C is a flow diagram of the exemplary device location verification method according to some embodiments of the present invention. Features in steps S402-S420 in this embodiment are identical to the steps S202-S220 in the embodiment disclosed in FIG. 2A. In addition, in step S422, the first client device 100 transmits a request to the server 102, and the server 102 correspondingly transmits the second token to the first client device 100 in step S424. In step S426, the first client device transmits the second token to the first network device 104 so that the first network device 104 knows that the user at the first client device 100 has logged in to the server 102. Accordingly, the verification method of the present invention enables the first client device 100, the sever 102 and the first network device 104 to verify that the first client device 100 and the first network device 104 are in a same network, and that the client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 2D:
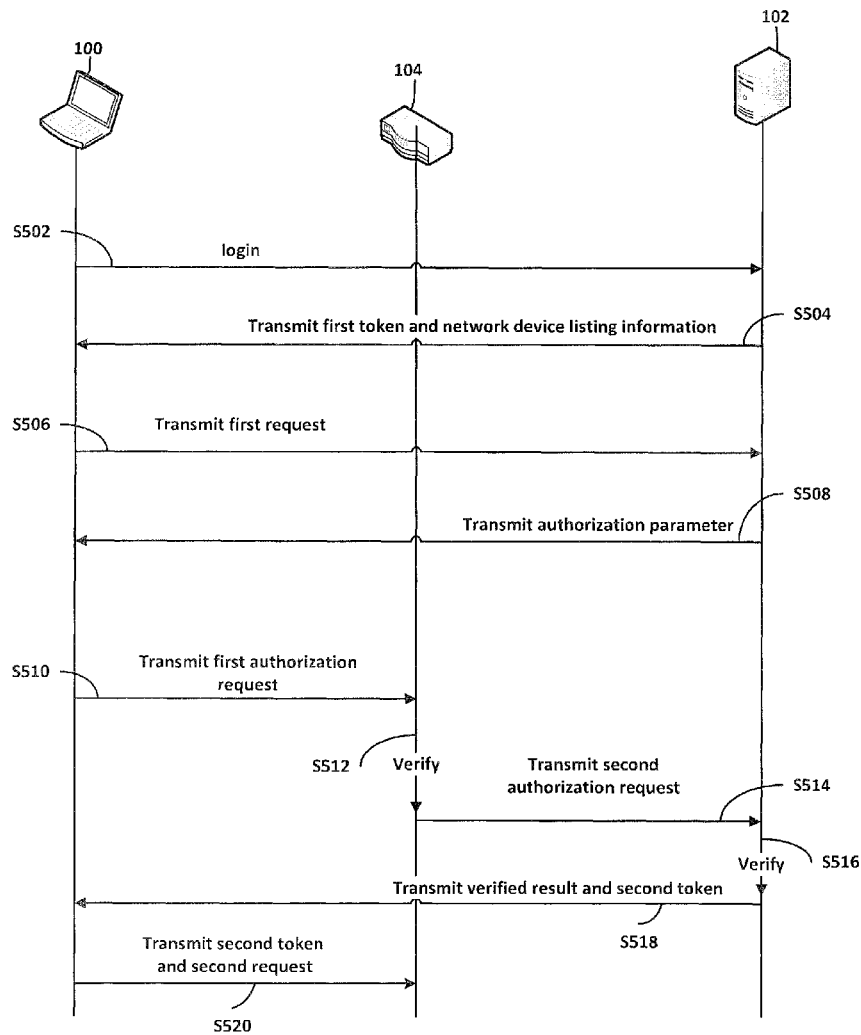

FIG. 2D is a flow diagram of the exemplary device location verification method according to some embodiments of the present invention. Features in steps S502-S516 in this embodiment are identical to the steps S202-S216 in the embodiment disclosed in FIG. 2A. The difference between this embodiment and the embodiment disclosed in FIG. 2A is in step S518 is that the server 102 transmits the verified result and the second token directly to the first client device 100. In step S520, the first client device 100 transmits the second token to the first network device 104 so that the first network device knows that the user at the first client device 100 has logged in to the server 102. In addition, the first client device 100 may transmit a second request to the first network device 104 to access the first network device 104, or ask the first network device to transmit data.

Accordingly, the verification method of the present invention enables the first client device 100, the sever 102 and the first network device 104 will verify that the first client device 100 and the first network device 104 are in a same network, and that the client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 2E:
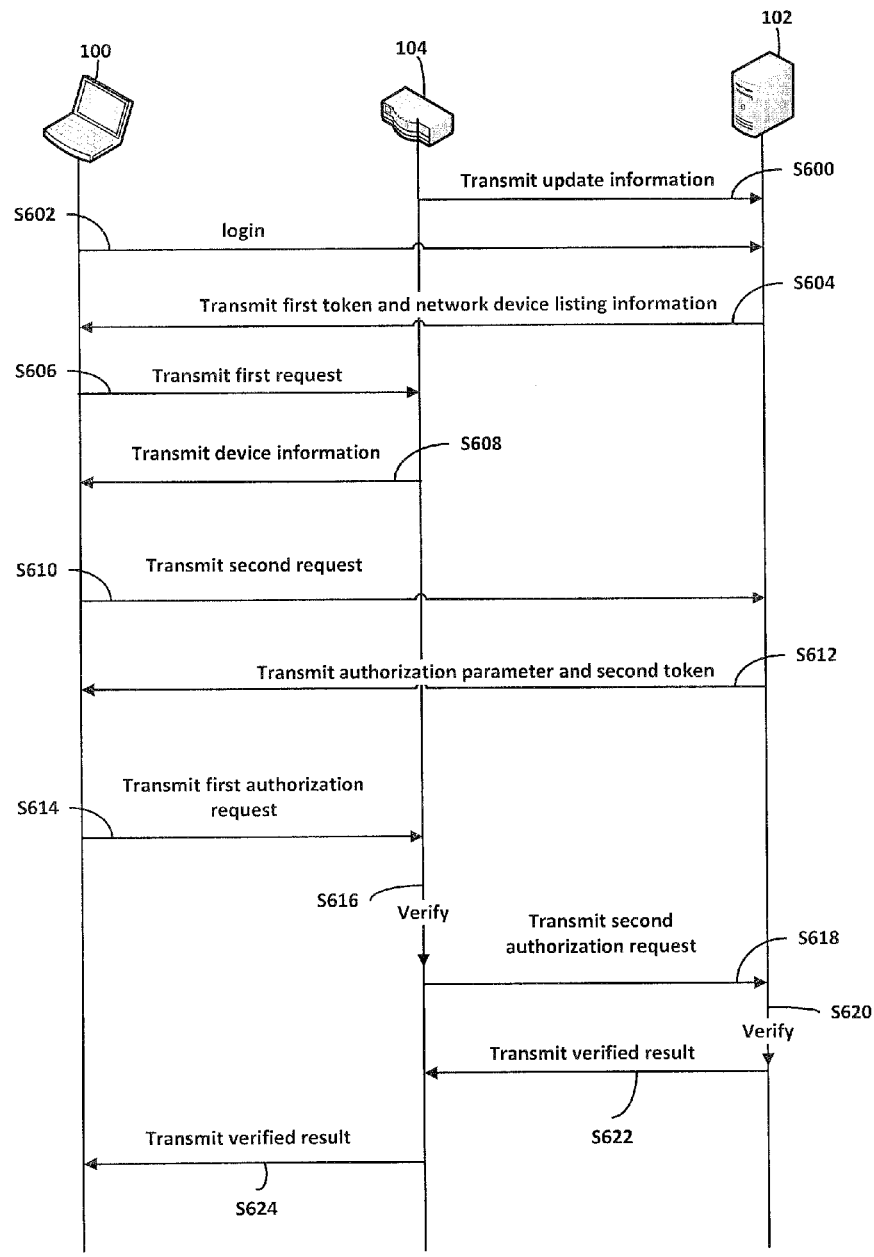

FIG. 2E is a flow diagram of the exemplary device location verification method according to some embodiments of the present invention. In step S600, the first network device 104 transmits update information to the server 102 so the server 102 knows latest condition of the first network device 104. Such update information may include the API version of the first network device 104. In addition, the update information may include device information, including but not limited to device ID, manufacturer name, model information and firmware version number, and network information including but not limited to wide area network IP and web service port number.

In step S602, a user at the first client device 100 logs-in to the server 102, and in step S604, the sever 102 correspondingly transmits a first token and a network device listing information. The first token enables the first client device 100 to control the first network device 104 to transmit an authorization request to the server 102 when the first client device 100 and the first network device are in a same network. That is, the first token enables the first network device 104 to verify that it is in a same network as the first client device 100. Moreover, the network device listing information may include a listing of all the network devices potentially in the same network as the first client device 100, the URL of API of the network devices, or the names of the network devices, but the present invention is not so limited. In steps S602 and S604, the first client device 100 and the server 102 verifies that a user at the first client device 100 has logged in to the server 102.

In step S606, the first client device 100 transmits a request having the first token to the first network device 104 according to the device listing information. The first token and the device listing information may trigger the browser of the first client device 100 to transmit such request. Alternatively, the user at the first client device 100 may select which network device to transmit such request according to the device listing information displayed in the browser. After the first network device 104 verifies that such request comprises the first token, the first network device 104 correspondingly transmits a device information to the first client device 100 in step S608. The device information may comprise an API version so as to enable the first client device 100 to verify that it's in the same network as the first network device 104. In addition, the API version may enable the first client device 100 to verify that the first network device 104 is accessible, i.e., is powered on. Moreover, the first network device 104 may transmit the update information, as disclosed in step S600, which includes, API version, device ID, manufacturer name, model information, firmware version number, wide area network IP and web service port number of the first network device 104, to the first client device 100 in step S608. Such information may be later transmitted to the server 102 to compare with the update information transmitted in step S600 such that the server 102 may verify that the first client device 100 and the first network device 104 are in a same network.

In step S610, the first client device 100 transmits a first request to the server 102. In addition, the first client device 100 may transmit the update information to the server 102 along with the first request. The server 102 then compares the update information transmitted from the first client device 100 in step S610 and the update information transmitted from the first network device 104 in step S600 to verify that the first client device 100 and the first network device 104 are in a same network. In step S612, the server 102 correspondingly transmits a second token and an authorization parameter to the first client device 100. The authorization parameter is later used by the first client device 100 to prove to the server 102 that it has logged in to the server 102, and that the first client device 100 and the first network device 104 are in a same network. The second token includes information enabling the first client device 100 to access the first network device 104. In further detail, the first client device 100 may access specific data, file, folder, directory or document in the first network device 104. The second token is later transmitted to the first network device 104 so the first network device 104 may verify that the first client device 100 has logged in to the server 102.

In step S614, the first client device 100 transmits a first authorization request to the first network device 104 according to the device listing information. The first authorization request comprises the first token, the authorization parameter and the second token. In step S616, the first network device 104 verifies that the first authorization request does comprise the authorization parameter and the first token. If no, the first network device transmits an error message to the first client device 100. If yes, the first network device 104 is triggered by the first token and transmits a second authorization request having the authorization parameter to the server 102 in step S618. In addition, in step S616, when the first network device 104 verifies that the first authorization request comprises the second token, the first network device 104 verifies that the first client device 100 has logged in to the server 102.

In step S620, the server 102 verifies whether the second authorization request comprises the authorization parameter. If no, the server 102 transmits an error message to the first network device 104. If yes, the server 102 generates a verified result. Through steps S610-S620, the server 102 verifies that the first client device 100 and the first network device 104 are in the same network, and that the user at the first client device 100 has logged in to the server 102. In step S622, the verified result is transmitted to the first network device 104. By receiving the verified result, the first network device 104 verifies that the user at the first client device 100 has logged in to the server 102. In step S624, the verified result is transmitted by the first network device 104 to the first client device 100. By receiving the verified result, the first client device 100 verifies that it is in the same network as the first network device 104. Thereafter, the first client device 100 may transmit the second token along with a request asking data transmission to the first network device 104. As a result, the first network device 104 may verify that the first client device 100 has logged in to the server 102, and further respond to such request. Alternatively, the verified result may be first transmitted to the first client device 100, and then to the first network device 104.

Accordingly, the verification method of the present invention enables the first client device 100, the sever 102 and the first network device 104 to verify that the first client device 100 and the first network device 104 are in a same network, and that the first client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 2F:
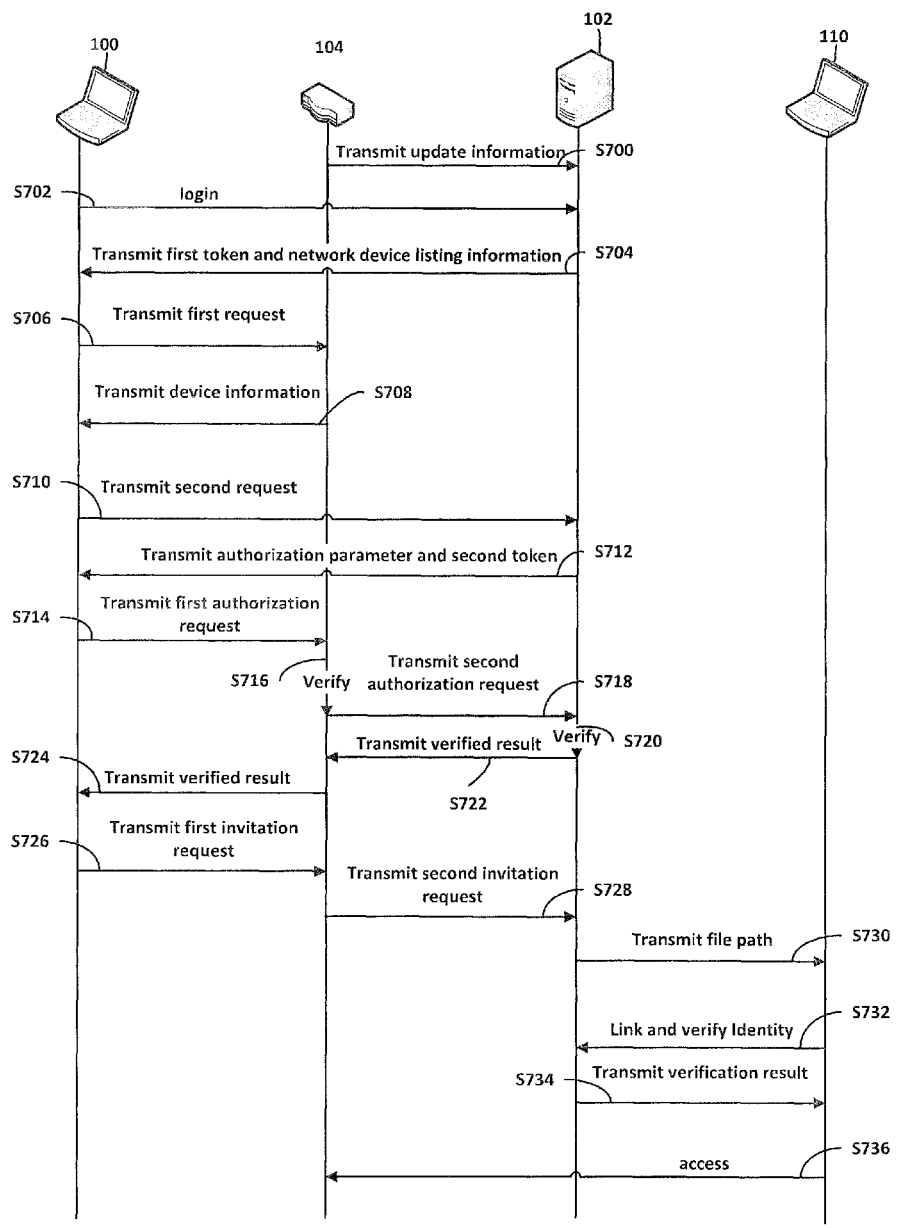

FIG. 2F is a flow diagram of the exemplary device location verification method according to some embodiments of the present invention. Features in steps S700-S724 in this embodiment are identical to the steps S600-S624 in the embodiment disclosed in FIG. 2E. The difference between this embodiment and the embodiment disclosed in FIG. 2E is the additional steps of inviting a user at the second client device 110 to access the first network device 104. Specifically, the second client device 110 is not in a same network as the first client device 100 and the first network device 104 are located.

After implementing steps S700-S724 of the present invention, the first client device 100, the sever 102 and the first network device 104 verify that the first client device 100 and the first network device 104 are in a same network, and that the first client device 100 has logged in to the server 102. Thereafter, in step S726, the first client device 100 transmits a first invitation request to the first network device 104, and the first network device 104 correspondingly transmits a second invitation request to the server 102 in step S728. In response to the second invitation request, the server 102 transmits a message having an URL to the second client device 110 in step S730. The URL enables the second client device 110 to login to the server 102. The message may be in the form of an electronic mail. In step S732, the second client device 110 connects to the URL and logs-in to the server 102. In step S734, the server 102 transmits a verification result to the second client device 110. The verification result is used by the first network device 104 to verify that the second client device 110 is invited by the first client device 100 to access the first network device 104. In step S736, the second client device 110 requests data from the first network device 104 according to the verification request. As a result, the verification method of the present invention enables the first client device 100 and the first network device 104 to verify that they are in a same network, and correspondingly allows the first client device 100 to invite a device that is not in such same network to access the first network device 104.

FIGS. 3A-3D are flowcharts of the device location verification method according to some embodiments of the present invention. The location of devices may be physical addresses of the devices or virtual addresses of the devices in a network.

Figure 3A:
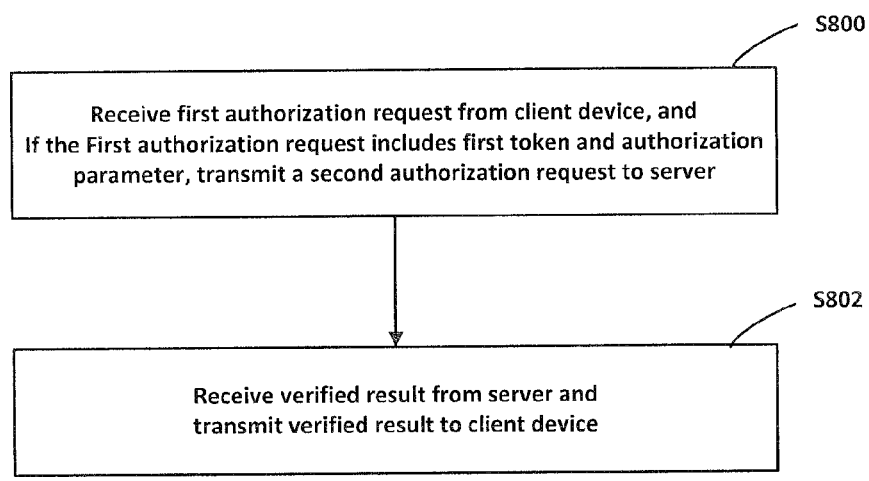
FIGS. 3A-3D are flowcharts of the device location verification method according to some embodiments of the present invention.

FIG. 3A is a flowchart of the exemplary device location verification method of a network device according to some embodiments of the present invention. In step S800, the first network device 104 executes steps S210-S214 of the embodiment disclosed in FIG. 2A. That is, in step S800, the first network device 104 receives a first authorization request from the first client device 100, and if the first authorization request comprises the first token and the authorization parameter, the first network device 104 transmits a second authorization request having the authorization request to the server 102. The first token is first transmitted along with a network device listing information from the server 102 to the first client device 100 corresponding to a user login at the server 102. Therefore, the first client device 100 and the server 102 both verify that the user at the first client device 100 has logged in to the server 102. The first token enables the first client device 100 to control the first network device 104 to transmit an authorization request to the server 102 when the first client device 100 and the first network device are in a same network. That is, the first token enables the first network device 104 to verify that it is in a same network as the first client device 100. Moreover, the network device listing information may include a listing of all the network devices potentially in the same network as the first client device 100, the uniform resource locator (URL) of the application programming interface (API) of the network devices, or the names of the network devices, but the present invention is not so limited. Thereafter, an authorization parameter is transmitted to the first client device 100 in response to a first request transmitted from the first client device 100. The authorization parameter is later used by the first client device 100 to prove to the server 102 that it has logged in to the server 102, and that the first client device 100 and the first network device 104 are in a same network. In addition, a second token may also be transmitted to the server 102 along with the authorization parameter. The second token includes information enabling the first client device 100 to access the first network device 104. The first network device 104 may receive the second token along with the first authorization request in step S800 so the first network device 104 may verify that the first client device 100 has logged in to the server 102. (Not illustrated.)

In addition, in step S802, the first network device executes steps S218 and S220 of the embodiment disclosed in FIG. 2A. That is, in step S802, the first network device 104 receives the verified result from the server 102 and transmits the verified result to the first client device 100. The verified result is first generated by the server 102 after the server verifies that a second authorization request transmitted from the first network device 104 to the server 102 comprises the authorization parameter. By receiving the verified result, the first network device 104 verifies that the user at the first client device 100 has logged in to the server 102. In addition, by receiving the verified result, the first client device 100 verifies that it is in the same network as the first network device 104. Alternatively, the first network device 102 may receive the verified result from the first client device 100 in step S802. (Not illustrated.) That is, the verified result is first transmitted to the first client device 100 before being transmitted to the first network device 102. It is to be noted that the first network device 104 may receive the second token from the first client device 100 along with the verified result so the first network device 104 may verify that the first client device 100 has logged in to the server 102 in step S802. (Not illustrated.)

Accordingly, the verification method of the present invention enables the first client device 100, the sever 102 and the first network device 104 to verify that the first client device 100 and the first network device 104 are in a same network, and that the first client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 3B:
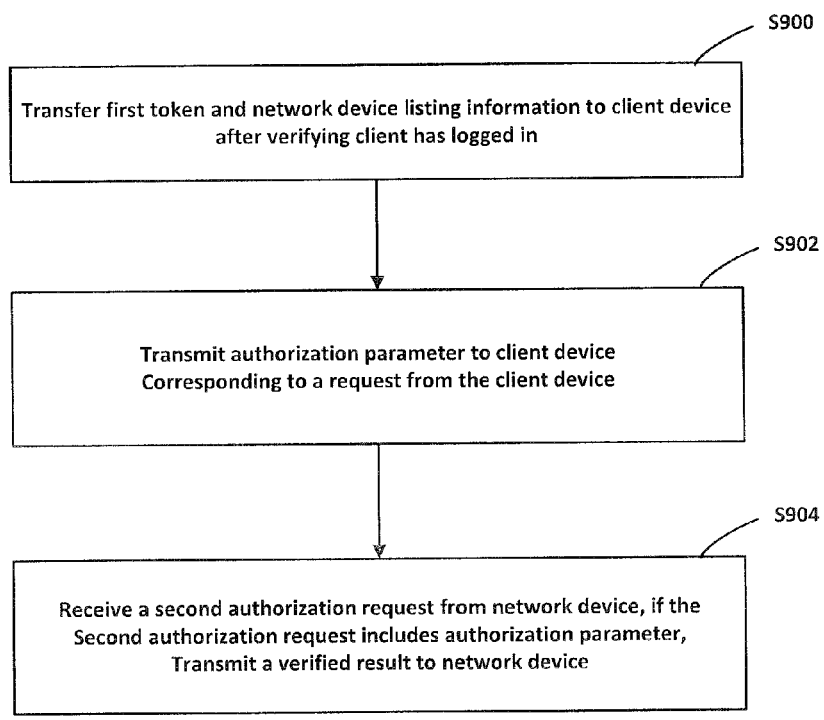

FIG. 3B is a flowchart of the exemplary device location verification method of a server according to some embodiments of the present invention. In step S900, the server 102 transmits a first token and a network device listing information to the first client device 100 after the server 102 verifies that the user at the first client device 100 has logged in to the server 102. The first token enables the first client device 100 to control a first network device 104 to transmit an authorization request to the server 102 when the first client device 100 and the first network device 104 are in a same network. That is, the first token enables the first network device 104 to verify that it is in a same network as the first client device 100. Moreover, the network device listing information may include a listing of all the network devices potentially in the same network as the first client device 100, the uniform resource locator (URL) of the application programming interface (API) of the network devices, or the names of the network devices, but the present invention is not so limited. In step S900, the first client device 100 and the server 102 both verify that a user at the first client device 100 has logged in to the server 102.

In step S902, the server 102 transmits an authorization parameter to the first client device 100 in response to a first request from the first client device 100. The authorization parameter may be used by the first client device 100 to prove to the server 102 that it has logged in to the server 102, and that the first client device 100 and the first network device 104 are in a same network. Furthermore, a second token may be transmitted along with the authorization parameter to the first client device 100 in step S902. (Not illustrated.) The second token includes information enabling the first client device 100 to access the first network device 104. The second token may later be transmitted from the first client device 100 to the first network device 104 so the first network device 104 may verify that the first client device 100 has logged in to the server 102.

In step S904, the server 102 receives a second authorization request from the first network device 104, and if the second authorization request comprises the authorization parameter, the server 102 generates a verified result and transmits the verified result to the first network device 104. The second authorization request is generated by the first network device 104 in response to the first authorization request transmitted from the first client device 100. The first authorization request comprises a first token and the authorization parameter. The first token enables the first network device 104 to know that the first client device 100 and the first network device 104 are in a same network. In detail, the first token may trigger the first network device 104 to broadcast in the local area network and determine whether the source of the response is within a same local area network. If yes, specific performance at the first network device 104 may be executed. In other words, the first token enables the first network device 104 to verify that the first client device 100 and the first network device 104 are in a same network. If yes, the first client device 100 may be authorized to control the first network device 104 to perform specific operations, such as responding specific information. In addition, the first client device 100 may control the first network device 104 to transmit a second authorization request to the server 102 corresponding to the first client device 100. Moreover, the second token may be transmitted along with the first authorization request to the first network device 104. When the first network device 104 verifies that the first authorization request comprises the second token, the first network device 104 may verify that the first client device 100 has logged in to the server 102. In steps S902-S904, the server 102 verifies that the first client device 100 and the first network device 104 are in the same network, and that the user at the first client device 100 has logged in to the server 102. Moreover, the verified result transmitted to the first network device 104 enables the first network device 104 to verify that the user at the first client device 100 has logged in to the server 102. The verified result is then transmitted to the first client device 100 so that the first client device 100 may verify that it is in the same network as the first network device 104. Alternatively, the server 102 may first transmit the verified result to the first client device 100, and then from the first client device 100 to the first network device 104. It is to be noted that the second token may be transmitted to the first network device 104 by the first client device 100 along with the verified result so the first network device 104 may verify that the first client device 100 has logged in to the server 102.

Accordingly, the verification method of the present invention enables the first client device 100, the sever 102 and the first network device 104 to verify that the first client device 100 and the first network device 104 are in a same network, and that the first client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 3C:
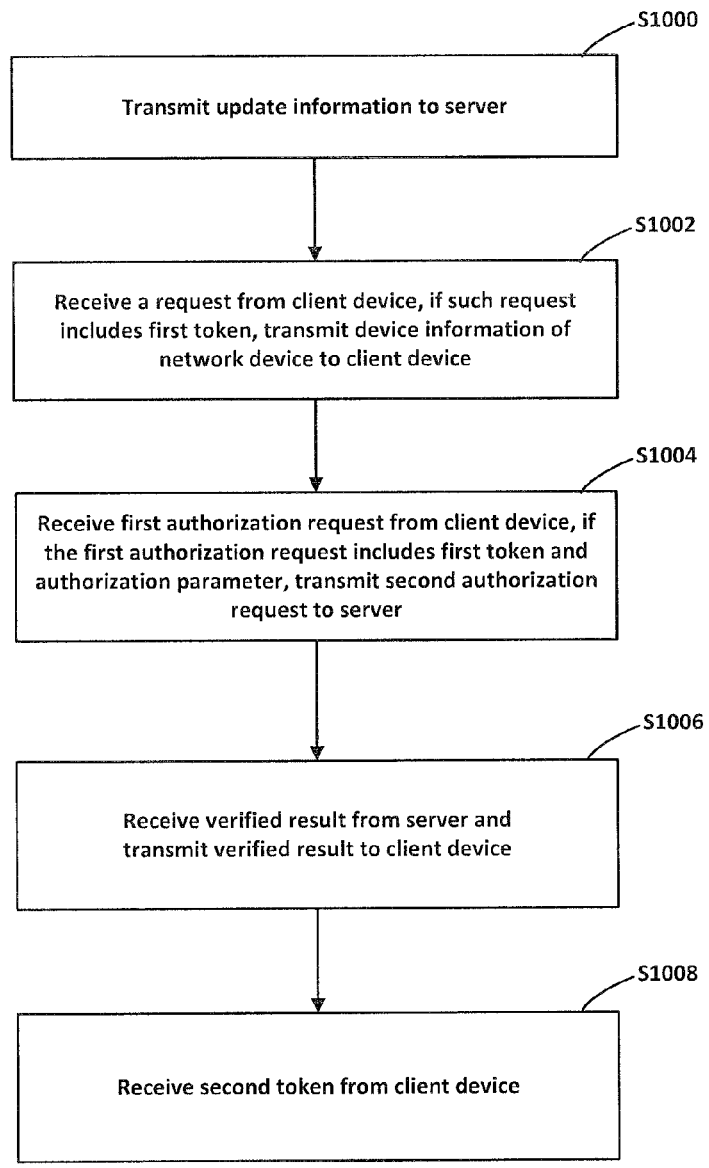

FIG. 3C is a flowchart of the exemplary device location verification method of a network device according to some embodiments of the present invention. In step S1000, the first network device 104 executes step S600 of the embodiment disclosed in FIG. 2E. That is, the first network device 104 transmits update information to the server 102 so the server 102 knows latest condition of the first network device 104. Such update information may include the API version of the first network device 104. In addition, the update information may include device information, including but not limited to device ID, manufacturer name, model information and firmware version number, and network information including but not limited to wide area network IP and web service port number.

In step S1002, the first network device 104 executes steps S606 and S608 of the embodiment disclosed in FIG. 2E. That is, the first network device 104 receives a request having a first token from the first client device 100 and correspondingly transmits a device information to the first client device 100. The first token enables the first client device 100 to control the first network device 104 to transmit an authorization request to the server 102 when the first client device 100 and the first network device are in a same network. That is, the first token enables the first network device 104 to verify that it is in a same network as the first client device 100. The device information may comprise an API version so as to enable the first client device 100 to verify that it's in the same network as the first network device 104. In addition, the API version may enable the first client device 100 to verify that the first network device 104 is accessible, i.e., is powered on. Moreover, the first network device 104 may transmit the update information, as disclosed in step S1000, which includes, API version, device ID, manufacturer name, model information, firmware version number, wide area network IP and web service port number of the first network device 104, to the first client device 100. Such information may be later transmitted to the server 102 by the first network device 104 to be compared with the update information transmitted in step S1000 such that the server 102 may verify that the first client device 100 and the first network device 104 are in a same network.

In step S1004, the first network device 104 receives a first authorization request from the first client device, verifies that the first authorization request comprise the first token and the authorization parameter, and correspondingly transmits a second authorization request having the authorization parameter to the server 102.

In step S1006, the first network device receives a verified result from the server 102 and transmits the authorization result to the first client device 100. The verified result is generated by the server 102 after the server 102 verifies that the second authorization request comprises the authorization parameter. By receiving the verified result, the first network device 104 verifies that the user at the first client device 100 has logged in to the server 102. By receiving the verified result, the first client device 100 verifies that it is in the same network as the first network device 104.

In step S1008, the first network device 104 receives a second token, which was transmitted from the server 102 to the first client device 100, from the first client device 100. The second token includes information enabling the first client device 100 to access the first network device 104. Further, the second token enables the first network device 104 to verify that the first client device 100 has logged in to the server 102. Alternatively, the second token may be received by the first network device 104 along with the first authorization request in step S1004.

Accordingly, the verification method of the present invention enables the first client device 100, the sever 102 and the first network device 104 to verify that the first client device 100 and the first network device 104 are in a same network, and that the first client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 3D:
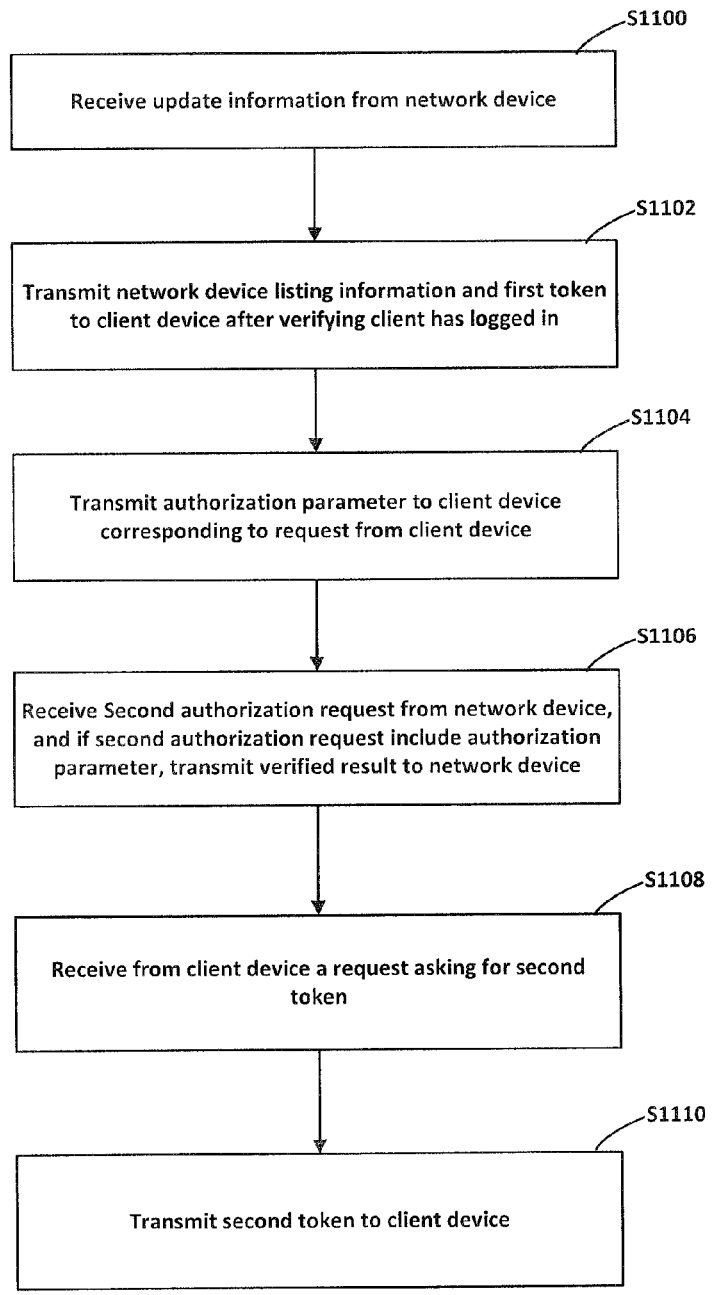

FIG. 3D is a flowchart of the exemplary device location verification method of a server according to some embodiments of the present invention. In step S1100, the server 102 executes step S600 of the embodiment disclosed in FIG. 2E. That is, the server 102 receives update information from the first network device 104 so the server 102 knows latest condition of the first network device 104. Such update information may include the API version of the first network device 104. In addition, the update information may include device information, including but not limited to device ID, manufacturer name, model information and firmware version number, and network information including but not limited to wide area network IP and web service port number.

In step S1102, the server 102 executes steps S602 and S604 of the embodiment disclosed in FIG. 2E. That is, the server receives a login request from the user of the first client device 100 and correspondingly transmits a first token and a network device listing information in step S1102. The first token enables the first client device 100 to control the first network device 104 to transmit an authorization request to the server 102 when the first client device 100 and the first network device are in a same network. That is, the first token enables the first network device 104 to verify that it is in a same network as the first client device 100. Moreover, the network device listing information may include a listing of all the network devices potentially in the same network as the first client device 100, the URL of API of the network devices, or the names of the network devices, but the present invention is not so limited. In step S1102, the first client device 100 and the server 102 verifies that a user at the first client device 100 has logged in to the server 102.

In step S1104, the server 102 executes steps S610 and S612 of the embodiment disclosed in FIG. 2E. That is, the server 102 receives a first request from the first client device 100 and correspondingly transmits an authorization parameter to the first client device 100. The authorization parameter is later used by the first client device 100 to prove to the server 102 that it has logged in to the server 102, and that the first client device 100 and the first network device 104 are in a same network. In addition, the server 102 may receive the update information from the first client device 100. The server 102 then compares the update information transmitted from the first client device 100 in step S610 and the update information transmitted from the first network device 104 in step S600 to verify that the first client device 100 and the first network device 104 are in a same network.

In step S1106, the server 102 receives a second authorization request from the first network device 104, and if the second authorization request comprises the authorization parameter, the server 102 transmits a verified result to the first network device 104. The second authorization request is generated by the first network device 104 after the first network device 104 receives a first authorization request from the first client device 100 and verifies that the first authorization request comprises the first token and the authorization parameter. The verified result may then be transmitted to the first client device 100 from the first network device 104. By receiving the verified result, the first network device 104 verifies that the user at the first client device 100 has logged in to the server 102. By receiving the verified result, the first client device 100 verifies that it is in the same network as the first network device 104. Alternatively, the verified result may be first transmitted to the first client device 100, and then to the first network device 104. (Not illustrated.) Through steps S1104 and S1106, the server 102 verifies that the first client device 100 and the first network device 104 are in the same network, and that the user at the first client device 100 has logged in to the server 102.

In step S1108, the server 102 receives a request from the first client device 100, asking for a second token. The second token includes information enabling the first client device 100 to access the first network device 104. In further detail, the first client device 100 may access specific data, file, folder, directory or document in the first network device 104. The second token may be later transmitted to the first network device 104 so the first network device 104 may verify that the first client device 100 has logged in to the server 102. Moreover, the request received from the first client device 100 is transmitted by the first client device 100 after the first client device 100 receives the verified result from the first network device 104. By receiving the verified result, the first client device 100 verifies that it is in the same network as the first network device 104.

In step S1110, the server 102 correspondingly transmits the second token to the first client device 100. Thereafter, the first client device 100 may transmit the second token to the first network device 104 such that the first network device 104 may verify that the first client device 100 has logged in to the server 102.

Accordingly, the verification method of the present invention enables the first client device 100, the sever 102 and the first network device 104 to verify that the first client device 100 and the first network device 104 are in a same network, and that the first client device 100 has logged in to the server 102, via a browser or application utilizing HTTP or any protocol. Specifically, protocols not capable of requesting an operating system to broadcast and capture response on the data link layer of the OSI model can also be used to implement the verification method of the present invention. As a result, communication within a same local area network between the first client device 100 and the first network device 104 may be established, and data may be transmitted between the first client device 100 and the first network device 104 without going through the server 102 outside such local area network.

Figure 4:
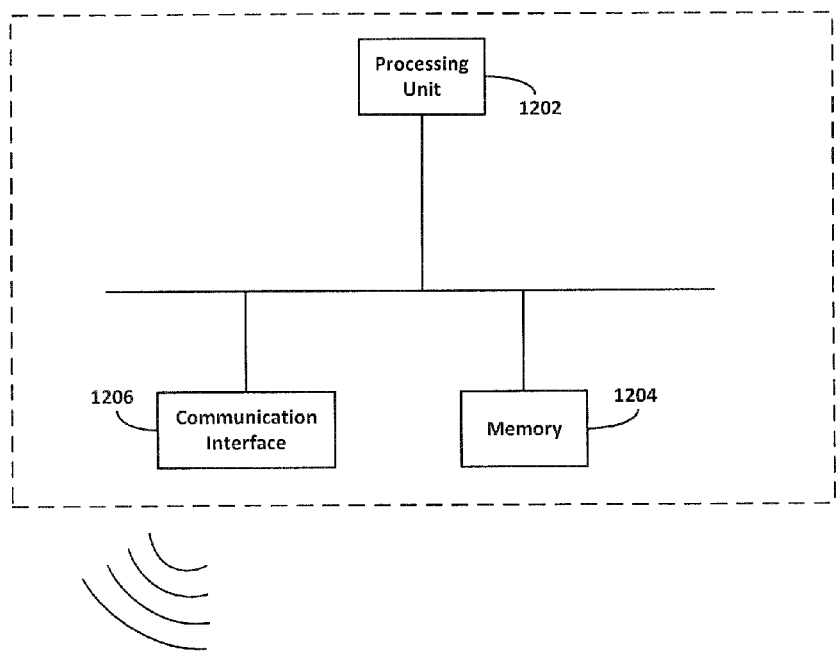
FIG. 4 is a block diagram of a network device for implementing the device location verification method according to some embodiments of the present invention.

FIG. 4 is a block diagram of a network device for implementing the device location verification method according to some embodiments of the present invention. In FIG. 4, the first network device 104 may comprise a processing unit 1202, a memory 1204 and a communication interface 1206. The processing unit 1202 is coupled to the memory 1204 and the communication interface 1206 to implement the device location verification method of the present invention, as disclosed herein. Specifically, the first network device 104 may be any electronic device capable of generating and/or storing digital contents. The processing unit 1202 may be one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

In addition, the memory 1204 is capable of storing the instructions of the device location verification method of the present invention. Consequently, the processing unit 1202 can access the memory 1204 and execute the instructions stored therein. The memory 1204 may be a volatile memory, which includes random access memories (RAM), dynamic random access memories (DRAM), static random access memories (SRAM), and other forms of volatile memories known in the art. Alternatively, the memory 1204 may be non-volatile storage memory, which includes magnetic hard discs, optical discs, floppy discs, flash memories, or forms of electrically programmable memories (EPROM) or electrically erasable and programmable (EEPROM) memories. Moreover, the communication interface 1206 may be a network interface card, an Ethernet card, an optical transceiver, a radio frequency transceiver, or any other type of device that can send and receive information. Examples of the communication interface 1206 may further include wireless interfaces such as Bluetooth®, 3G and WiFi® radios, or wired interface such as USB.

The device location verification method described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Previous descriptions are only embodiments of the present invention and are not intended to limit the scope of the present invention. Many variations and modifications according to the claims and specification of the disclosure are still within the scope of the claimed invention. In addition, each of the embodiments and claims does not have to achieve all the advantages or characteristics disclosed. Moreover, the abstract and the title only serve to facilitate searching patent documents and are not intended in any way to limit the scope of the claimed invention.

What is claimed is:

1. A method for verifying locations of devices implemented in a system having at least a server, a client device and a network device, the method comprising:
   receiving in a server a first request from a client device and correspondingly transmitting from the server a first response to the client device, wherein the first response comprises a first token and a network device listing information, and the first token enables the client device to control the network device;
   receiving in the server a second request from the client device and correspondingly transmitting from the server a second response to the client device, wherein the second response comprises an authorization parameter;
   receiving in the network device a first authorization request from the client device, and when the first authorization request comprises at least the first token and the authorization parameter, transmitting from the network device a second authorization request to the server;
   receiving in the server the second authorization request from the network device and verifying in the server that whether the second authorization request comprises at least the authorization parameter; and
   generating in the server a verified result after verifying the second authorization request comprises at least the authorization parameter, and transmitting from the server the server the verified result to the network device, transmitting by the network device the verified result to the client device for the client to verify it is in the same network as the network device;
   receiving, at the client device, the verified result from the network device, wherein the verified result verifies the client device is in the same network as the network device.

2. The method according to claim 1, further comprising:
   receiving in the network device a third request from the client device and correspondingly transmitting from the network device a third response to the client device, wherein the third response comprises a device information of the network device.

3. The method according to claim 1, further comprising:
   transmitting from the server a second token to the client device; and receiving in the network device the second token from the client device, wherein the second token enables the client device to access the network device.

4. A method for verifying locations of devices implemented in a system having at least a server, a client device and a network device, the method comprising:
   receiving a first request from a client device and correspondingly transmitting a first response to the client device, wherein the first response comprises a first token and a network device listing information and the first token enables the client device to control the network device;
   receiving a second request from the client device and correspondingly transmitting a second response to the client device, wherein the second response comprises an authorization parameter;
   receiving the second authorization request from the network device and verifying that whether the second authorization request comprises the authorization parameter; and
   generating a verified result after verifying the second authorization request comprises at least the authorization parameter, and transmitting the verified result to the network device, wherein the verified result is transmitted by the network device to the client device, for the client device to verify it is in the same network as the network device;
   receiving, at the client device, the verified result from the network device, wherein the verified result verifies the client device is in the same network as the network device.

5. The method according to claim 4, further comprising:
   transmitting a second token to the client device, wherein second token enables the client device to access the network device.

6. A method for verifying locations of devices implemented in a system having at least a server, a client device and a network device, the method comprising:
   receiving a first authorization request from a client device and when the first authorization request comprises at least a first token and an authorization parameter, transmitting a second authorization request to a server; and
   receiving a verified result from the server,
   wherein the first token is transmitted from the server to the client device along with a network device listing information after the server receives a first request from the client device, and the first token enables the client device to control the network device,
   wherein the authorization parameter is generated by the server if the server verifies that the second authorization request comprises at least the authorization parameter, and the verified result is transmitted to the client device, for the client device to verify it is in the same network as the network device,
   receiving, at the client device, the verified result from the network device, wherein the verified result verifies the client device is in the same network as the network device.

7. The method according to claim 6, further comprises:
   receiving a third request from the client device and correspondingly transmitting a third response to the client device, wherein the third response comprises a device information of the network device.

8. The method according to claim 6, further comprises:
   receiving a second token from the client device, wherein the second token is first transmitted from the server to the client device, wherein the second token enables the client device to access the network device.

9. A network device for verifying locations of devices in a system having at least a server and a client device and the network device, the network device comprising:
   a memory;
   a communication interface communicatively coupled to the memory, the communication interface for receiving a first authorization request from a client device wherein the first authorization request comprises an authorization parameter, and for receiving a verified result from a server, the communication interface further for transmitting a second authorization request to the server; and
   a processing unit that controls the network device,
   wherein the authorization parameter is transmitted from the server to the client device after the server receives a second request from the client device,
   wherein the second authorization request is transmitted to the server if the first authorization request comprises at least a first token and the authorization parameter, wherein the first token enables the client device to control the network device,
   wherein the first token is transmitted from the server to the client device along with a network device listing information after the server receives a first request from the client device,
   wherein the verified result is transmitting to the client, for the client device to verify that it is in the same network as the network device,
   receiving, at the client device, the verified result from the network device, wherein the verified result verifies the client device is in the same network as the network device.

10. The network device according to claim 9, further comprising:
    the communication interface receiving a second token from the client device, wherein the second token is transmitted from the server to the client device, wherein the second token enables the client device to access the network device.

11. The network device according to claim 9, further comprising:
    the communication interface receiving a third request from the client device and correspondingly transmitting a third response to the client device, wherein the third response comprises a device information of the network device.

12. A computer readable storage device comprising computer executable instructions for carrying out a method for verifying locations of devices implemented in a system having at least a server, a client device and a network device, the method comprising:
    receiving a first authorization request from a client device and when the first authorization request comprises at least a first token and an authorization parameter, transmitting a second authorization request to a server; and
    receiving a verified result from the server,
    wherein the first token is transmitted from the server to the client device along with a network device listing information after the server receives a first request from the client device, and the first token enables the client device to control the network device,
    wherein the authorization parameter is transmitted from the server to the client device after the server receives a second request from the client device,
    wherein the verified result is generated by the server if the server verifies that the second authorization request comprises at least the authorization parameter, and the verified result is transmitted to the client device, for the client device to verify it is in the same network as the network device, receiving, at the client device, the verified result from the network device, wherein the verified result verifies the client device is in the same network as the network device.

13. The computer readable storage device comprising computer executable instructions for carrying out the method for determining locations of a client device and a network device according to claim 12, further comprising:

receiving a second token from the client device, wherein the second token is first transmitted from the server to the client device, wherein the second token enables the client device to access the network device.

14. The computer readable storage device comprising computer executable instructions for carrying out the method for determining locations of a client device and a network device according to claim 12, further comprising:

receiving a third request from the client device and correspondingly transmitting a third response to the client device, wherein the third response comprises a device information of the network device.

\* \* \* \* \*